Patented Nov. 27, 1928.

1,693,432

UNITED STATES PATENT OFFICE.

MAX BOCKMÜHL, OF HOCHST-ON-THE-MAIN, AND ADOLF SCHWARZ, OF FRANKFORT-ON-THE-MAIN, GERMANY, ASSIGNORS, BY MESNE ASSIGNMENTS, TO WINTHROP CHEMICAL COMPANY, OF NEW YORK, N. Y., A CORPORATION OF NEW YORK.

THERAPEUTICALLY-ACTIVE AROMATIC COMPOUND CONTAINING MERCURY IN A LATERAL CHAIN AND PROCESS OF MAKING THE SAME.

No Drawing. Application filed May 5, 1923, Serial No. 637,020, and in Germany May 12, 1922.

We have discovered that aromatic mercury compounds possessing the general formula X—R—Y in which R stands for an aromatic carbocyclic or heterocyclic radical, X a side chain containing mercury, and Y a group which renders the compound soluble in water, are medicinals which exhibit extraordinary therapeutic action. These compounds can be prepared by mercurating aromatic substances which contain an unsaturated alkyl radical and a group which renders the substance soluble in water, whereby addition products are formed with the mercury and the double bond is opened. The resulting mercury compounds are converted into their salts, if necessary.

The new compounds can also be prepared by starting with water-insoluble mercurated aromatic substances which are obtained by mercurating aromatic compounds which contain an unsaturated alkyl radical, and introducing into such substances suitable groups such as the $SO_3H$, $COOH$ or $CH_2COOH$ groups, which are capable of forming salts and which render the compounds soluble in water.

The mercurating agents may be mercury oxides or mercury salts.

The new compounds are colorless powders which dissolve easily in water and which contain the mercury in a disguised state.

Examples.

1. To 12 parts of eugenol-acetic acid in 50 parts of methyl alcohol is added a solution of 15,9 parts of mercuric acetate in 200 parts of methyl alcohol. On standing the mercurated acid crystallizes out, and is filtered off after some time and washed with methyl alcohol and ether. The melting point is 172° C. The new compound is insoluble in water, ethyl alcohol, methyl alcohol and ether. It dissolves in caustic soda solution without any separation of mercury oxide. Ammonium sulphide in the cold does not precipitate any HgS, and decomposition sets in slowly only after the alkaline solution has been boiled for a long time. The sodium salt of the mercurated acid is readily soluble in water and probably possesses the following formula:

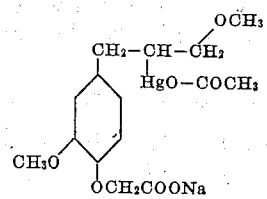

If the mercurated acid is allowed to stand for a time with two molecules of an aqueous solution of caustic soda the acetyl group is split off and the compound free from the acetyl group which also in the form of its alkali metal salt is readily soluble in water may then be precipitated by acetic acid. By treatment with a solution of common salt the acetyl group is replaced by chlorine.

2. 23,6 parts of sodium p-allyloxybenzenesulphonate

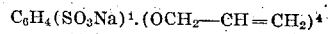

in an aqueous solution are shaken with mercury oxide, obtained from 27,1 parts of mercuric chloride by precipitation with caustic soda solution, until the oxide is dissolved. On pouring the solution so produced into alcohol the sodium salt of the mercurated acid, which is readily soluble in water separates as a white powder. The compound has the formula

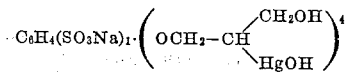

The p-allyloxybenzenesulphonic acid is obtained for instance by reacting with 13 parts of allyl bromide on 21,2 parts of potassium p-phenol-sulphonate and 5,6 parts of caustic potash in an alcoholic solution and acidifying the product of the reaction. The sodium salt of the compound separates from its aqueous solution upon the addition of common salt.

3. To a solution of 108,9 parts of 4-allyl-oxy-3-bromo-1-benzoic acid

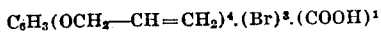

in 2000 parts of methyl alcohol is added a solution of 134,8 parts of mercuric acetate in 2000 parts of methyl alcohol. After a short time the mercurated acid crystallizes out whereupon it is filtered off and washed with methyl alcohol and ether. Melting point 185° C. The sodium salt of this acid is readily soluble in water. The 4-allyloxy-3-bromo-1-benzoic acid can be produced by the action of 15,87 parts of allyl bromide upon a solution of 30,3 parts of 4-hydroxy-3-bromo-1-benzoic acid methyl ester and 3,02 parts of sodium in 120 parts of methyl alcohol and by saponifying the ester thus obtained by boiling it with caustic soda solution. The acid crystallizes from acetone in the form of white needles melting at 179° C.

In an analogous manner are obtained the mercurated compounds from 3-chloro-4-allyl-oxy-1-benzoic acid

(melting point 157° C.) and 3,5-dibromo-4-allyloxy-1-benzoic acid

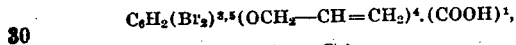

(melting point is 175° C.).

4. To a solution of 50,8 parts of salicylic acid allylamid-O-acetic acid

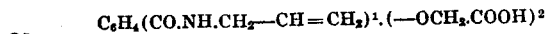

in 500 parts of methyl alcohol is added a solution of 68,5 parts of mercuric acetate in 1000 parts of methyl alcohol. After some time the mercurated compound precipitates as an oil which, after the methyl alcohol has been decanted and after being rubbed with water becomes crystalline. By the action of sodium alcoholate the sodium salt, which is readily soluble in water, is obtained. The salicylic acid allylamide-O-acetic acid can be prepared by boiling 18,28 parts of salicylic acid allylamid and 10,68 parts of monochloracetic acid with a solution of 9,45 parts of caustic soda solution in 120 parts of water. It crystallizes from diluted methyl alcohol in the form of white crystals melting at 120° C.

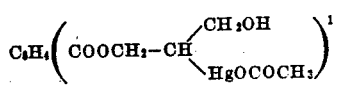

The p-diethylaminoethoxybenzoic acid allylester can be prepared in the following manner: 39 parts of p-hydroxybenzoic acid are esterified with 78 parts of allyl alcohol in presence of 4 parts of concentrated sulphuric acid. The ester thus obtained crystallizes from benzene, and melts at 105° C. 30,7 parts of allylester and 30 parts of chlorethyl- 5. 26,3 parts of 1-allyl-4-diethylamino-ethoxy-5-methoxybenzene

in the form of its p-phenol sulphonate are mixed in an aqueous solution with a solution of 31,8 parts of mercuric acetate in water, and this mixture is allowed to stand for some time. On evaporating the product in vacuo there remains the mercurated compound which is readily soluble in water as a water-clear oil. The 1-allyl-4-diethylaminoethoxy-5-methoxy-benzene is obtained by condensing 24,7 parts of eugenol, 2,3 parts of sodium in 100 parts of alcohol and 15 parts of chlorethyldiethylamine; it melts at 158° C. at 10 mm. pressure.

6. 50,8 parts of N-methyl-8-hydroxy-tetra-hydroquinoline-allyl ether

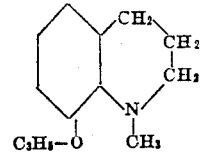

in the form of its sulphate are allowed to stand for some time in an aqueous solution of 79,5 parts of mercuric acetate. On pouring the resulting solution into acetone the mercurated compound precipitates as an oil which on being rubbed with fresh acetone becomes solid and crystalline. The compound thus obtained is readily soluble in water. The N-methyl-8-hydroxy-tetrahydroquinoline-allylether is prepared for instance by causing 22,5 parts of allyl bromide to act upon a solution of 24,45 parts of N-methyl-8-hydroxy-tetrahydroquinoline in 150 parts of caustic soda solution of 4 percent strength; it melts at 194-196° C. at a pressure of 12 mm.

7. 13,85 parts of p-diethylaminoethoxy-benzoic acid allylester

are mixed in the form of its tartrate in an aqueous solution with a solution of 15,95 parts of mercuric acetate in water; this mixture is allowed to stand for some time and then evaporated in vacuo. The remaining water-soluble oil becomes solid and crystalline when rubbed with acetone.

The compound has the formula:

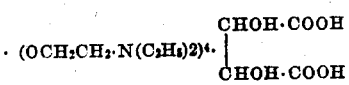

diethylamine are condensed in a solution of 3,91 parts of sodium in 150 parts of alcohol. The p-diethylaminoethoxybenzoic acid allylester boils at 210° C. under 10 mm. pressure being a colourless oil. Its hydrochloride melts at 86° C.

8. In an analogous manner as that set out in example 7 there is obtained from 21,49 parts of mercuric acetate and the aqueous solution of the tartrate from 18,70 parts of allylether of the p-hydroxybenzoic acid diethylaminoethylester

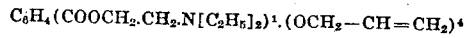

the mercurated compound in the form of a water-soluble oil. The allylether of the p-hydroxybenzoic acid diethylaminoethylester is obtained for instance in the following manner: 91,2 parts of p-hydroxybenzoic acid methylester are condensed with 81 parts of allylbromide in presence of a solution of 13,8 parts of sodium in 300 parts of methyl alcohol, and the ester thus obtained is saponified with caustic soda solution. The p-allyloxybenzoic acid crystallizes from methyl alcohol; it melts at 164° C. 79 parts of the allyl ether acid are dissolved in a solution of 10,2 parts of sodium in 400 parts of alcohol and condensed with 70 parts of chlorethyldiethylamine. The allyl ether of the p-hydroxy-benzoic acid diethylaminoethylester is a colourless oil which boils at 220° C. under a pressure of 15 mm. Its hydrochloride melts at 193° C.

9. To a solution of 8,2 parts of eugenol in 20 parts of methyl alcohol is added a solution of 15,9 parts of mercuric acetate in 200 parts of methyl alcohol. After some time the methyl alcohol is distilled off in vacuo the residue is allowed to stand for some time with an aqueous solution of 4 parts of caustic soda and 4,7 parts of monochloracetic acid, then heated for about another 1-2 hours and finally evaporated in vacuo. From the residue the sodium salt of the mercurated eugenol acetic acid can be extracted with methyl alcohol. By adding ether, the sodium salt which is identical with the compound described in Example 1, is precipitated.

Having now described our invention, what we claim is:

1. The process of preparing therapeutically active mercury compounds which comprises mercurating aromatic compounds which contain an unsaturated alkyl radical and a group which renders the aromatic compound water-soluble.

2. Process of preparing therapeutically active mercury compounds which comprises mercurating aromatic compounds which contain an unsaturated alkyl radical and a group which renders the aromatic compound water-soluble, and converting the resulting compounds into salts.

3. Process of preparing therapeutically active mercury compounds which comprises mercurating aromatic compounds which contain an allyl radical and a group which renders the compounds water-soluble.

4. Process of preparing therapeutically active mercury compounds which comprises mercurating aromatic compounds which contain an allyl radical and a group which renders the compounds water-soluble, and converting the resulting compounds into their alkali metal salts.

5. Process of preparing therapeutically active mercury compounds which comprises mercurating aromatic compounds containing an allyl radical and the $CH_2COOH$ group.

6. Process of preparing therapeutically active mercury compounds which comprises mercurating aromatic compounds containing an allyl radical and the $CH_2COOH$ group and converting the resulting compounds into their alkali metal salts.

7. As new products the compounds corresponding to the general formula X—R—Y, in which R stands for an aromatic residue, X a side chain containing mercury, and Y a group which renders the compound soluble in water.

8. As new products the compounds corresponding to the general formula X—R—Y, in which R stands for an aromatic residue, X a side chain containing mercury, and Y the salt of a group which renders the compound water-soluble in water.

9. As new products the compounds corresponding to the general formula X—R—Y, in which R stands for a phenolic residue, X the group

(in which Z is a mercurated allyl radical) and Y a group which renders the compound water-soluble.

10. As new products, the compounds corresponding to the general formula X—R—Y, in which R stands for a phenolic residue, X the group

(in which Z is a mercurated allyl radical), and Y the group $CH_2COONa$.

11. As new products the compounds corresponding to the formula

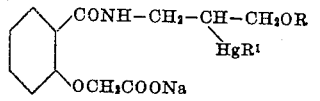

in which R stands for hydrogen or alkyl and R' stands for hydroxyl or an acid residue.

12. As a new product the compound corresponding to the formula

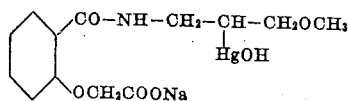

In testimony whereof, we affix our signatures.

Dr. MAX BOCKMÜHL.
Dr. ADOLF SCHWARZ.